E. O. SCHWEITZER AND N. J. CONRAD.

MEANS FOR EXTINGUISHING ARCS.

APPLICATION FILED APR. 16, 1920.

Reissued June 22, 1920.

14,897.

2 SHEETS—SHEET 1.

Inventors.
Edmund O. Schweitzer.
and Nicholas J. Conrad.
by Zabel & Mueller
Attorneys.

E. O. SCHWEITZER AND N. J. CONRAD.

MEANS FOR EXTINGUISHING ARCS.

APPLICATION FILED APR. 16, 1920.

Reissued June 22, 1920.

14,897.

2 SHEETS—SHEET 2.

Inventors.

Edmund O. Schweitzer.
and Nicholas J. Conrad.
by Fabel & Mueller
Attorneys.

UNITED STATES PATENT OFFICE.

EDMUND O. SCHWEITZER, OF CHICAGO, AND NICHOLAS J. CONRAD, OF WILMETTE, ILLINOIS, ASSIGNORS TO SCHWEITZER & CONRAD, OF CHICAGO, ILLINOIS, A CORPORATION OF ILLINOIS.

MEANS FOR EXTINGUISHING ARCS.

14,897. Specification of Reissued Letters Patent. Reissued June 22, 1920.

Original No. 1,319,907, dated October 28, 1919, Serial No. 120,625, filed September 18, 1916. Application for reissue filed April 16, 1920. Serial No. 374,489.

*To all whom it may concern:*

Be it known that we, EDMUND O. SCHWEITZER and NICHOLAS J. CONRAD, citizens of the United States, residing at Chicago and Wilmette, respectively, in the county of Cook and State of Illinois, have invented a certain new and useful Improvement in Means for Extinguishing Arcs, of which the following is a full, clear, concise, and exact description, reference being had to the accompanying drawings, forming a part of this specification.

Our invention relates to means for extinguishing arcs.

In the matter of interrupting heavy currents of electricity either for normal switching or in the case of protective apparatus the physical separation of the electrical contacts or conducting parts where the current is to be interrupted is a relatively simple matter in itself. However, the separation of the physical conducting pieces does not necessarily entail an interruption of the current flow as the current flow continues in the shape of an arc of greater or less severity depending upon numerous factors such as voltage, frequency, speed of separation of the conductors, resistance and reactance of the circuit, and the like.

Whether the condition of interrupting the current flow be caused in a purely switching operation or whether in the rupture of a fusible cut-out, or in some other automatic overload circuit-breaking device the same consequence of breaking the continuity of the normal conducting path results in the formation of an arc of greater or less severity. The increase in voltage which has occurred in the recent decades has greatly increased the difficulties of interrupting current flow.

We have heretofore developed a number of fusible cut-outs to meet special condition of breaking current flow as shown in patents granted to us—Nos. 1008496, 1033384, 1050493 and 1135548, and while those patents refer particularly to fusible cut-outs their teaching applies as well to other switching operation. Our present invention provides certain specific improvements particularly for use in connection with the type of apparatus specifically described in those patents and for use in connection with switching or current interrupting devices generally.

The primary aim of this invention is to provide improved arc extinguishing liquid means for use in current interrupting apparatus. The invention aims further to provide an improved container of insulation for use in fusible cut-outs of the type above set out. Other and further objects will appear from the following description.

Heretofore in liquid inclosed fuses and switches oil has been very widely used. Oil has a number of marked disadvantages, among which are its inflammability and likelihood of causing an explosion and its hygroscopic character. This latter quality causes it to deteriorate in insulating strength and require renewing. When it leaks out of a switch chamber, it discolors and soils the floor leaving unsightly grease spots.

As an improvement upon oil for current interrupting apparatus we have heretofore employed carbon tetrachlorid. This is a thin freeflowing liquid having a low boiling point (76.5 C.) very volatile, having a high vapor pressure and fairly low freezing point. We have found that it has decided advantages over oil as it has a high insulating value, high break down strength, does not absorb water unduly and is a fairly stable material. But useful as we have found it, it has defects which render it difficult to employ with complete satisfaction in apparatus of this type. Perhaps the greatest disadvantage of carbon tetrachlorid is the fact that it attacks nearly all metals. This action on metal is increased by the presence of moisture or light. Another great difficulty is its tendency to evaporate when left in an open vessel. Its vapor pressure is high and boiling point relatively low. As a consequence we have found it unsuited for use in the usual open well, such as is employed commonly in oil switches. Due to its great fluidity it escapes very quickly through even a minute opening and as it leaves no telltale stain it is difficult to ascertain the condition of the switch.

We have discovered a limited class of substances which are better adapted for use as arc extinguishing liquids than any heretofore known.

These substances have characteristics more favorable for use in this connection than carbon tetrachlorid or oil. These substances are poly-chloro-derivatives of ethane and ethylene.

The particular substances which we have discovered to be valuable in this connection are:—

Tetrachloro ethylene ($C_2Cl_4$)
Tetrachloroethane ($C_2H_2Cl_4$)
Pentachloroethane ($C_2HCl_5$)
Hexachloroethane ($C_2Cl_6$)

These substances, which may be designated broadly as poly-halogen-derivatives, more particularly poly-chloro-derivatives of hydrocarbons having more than one carbon atom in the molecule, may be employed as mixtures or solutions in any desired proportion. The first three substances are liquids at room temperature and may be employed alone. The last substance is solid at room temperature and may be dissolved in the other liquids. The desired density may be obtained by suitable mixtures or solutions of the substances.

In order to make clear to those skilled in the art one particular manner of carrying out our invention, we shall now point out in connection with the accompanying drawings one specific manner in which the invention may be embodied.

In the accompanying drawings we have illustrated a form of fuse in which the above mentioned liquids are employed to good advantage.

Figure 2:
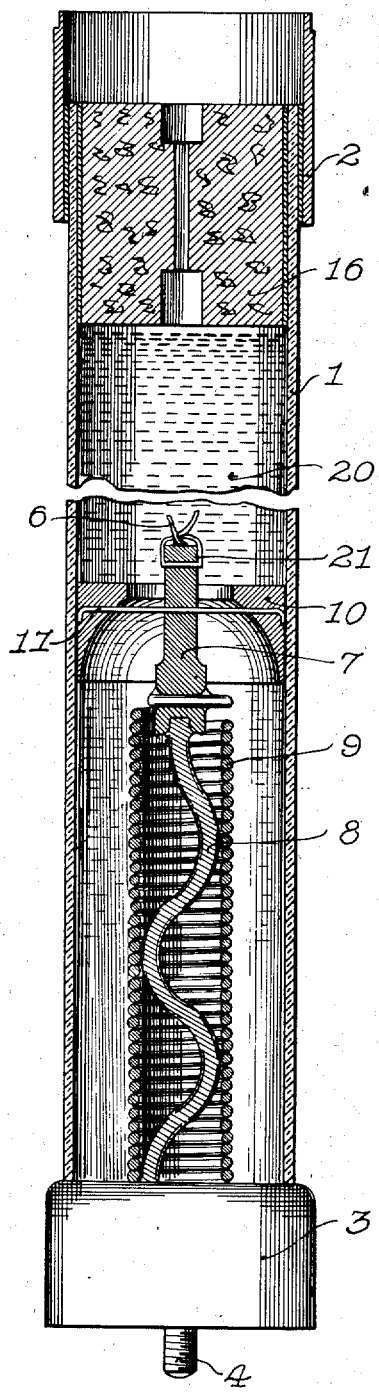
Fig. 2 is a similar view of the same after the fuse has blown.

The fuses above illustrated are of the type shown in our above mentioned patents. The body of the fuse is formed of a sleeve or tube 1 of insulating material. Upon the ends of the sleeve or tube 1 are secured the metal ferrules 2 and 3 which form terminals for the conducting parts of the fuse contained within the sleeve 1.

The lower ferrule 3 is closed off by a suitable head, bearing a mounting stud 4. In the form shown in Fig. 3 the upper ferrule is provided with an annular plate or ring 5 which is soldered or otherwise interconnected to the interior surface thereof above the end of the insulating sleeve 1.

The annular ring 5 is connected by fusible wires 6 to a metal stud 7 which in turn is connected to the lower ferrule 3 by the flexible stranded conductor 8. A coil spring 9 which is normally under tension is fastened at its lower end to the head of the ferrule 3 and at its upper end to the stud 7. A liquid directing or spraying member 10 is mounted upon the metal stud 7 and tends to direct or squirt liquid upon the place where the arc is drawn when the fuse blows. The liquid director 10 is in fact a plunger fitting more or less closely into the tube 1 and having an aperture through the center thereof about the metallic stud 7. A wire 11 passes through the plunger 10 and the stud 7 thereby suitably connecting these two parts.

Figure 3:
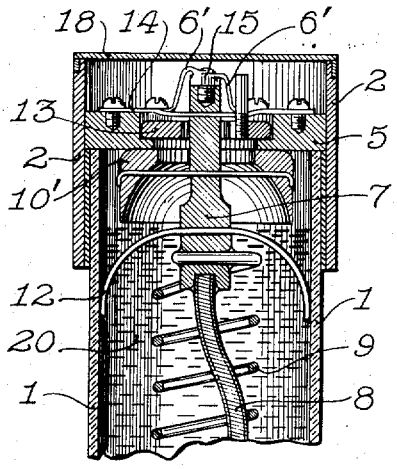
Fig. 3 is a fragmentary sectional view of a fuse of modified form.

In the form shown in Fig. 3, the plunger 10′ fits quite loosely within the insulating tube or sleeve 1, the stud 7′ and plunger 10′ being guided by suitable fingers 12 formed of wire and secured to the stud 7′. In this form of the device the stud 7′ projects up through a non-conducting washer 13 and is held in place by a wire 14 which passes through the stud 7′ and is secured at each end under suitable screws fastened to the ring 5. The top of the stud 7′ is provided with a removable screw 15 to which a number of fuse wires 6′ are fastened.

Figure 1:
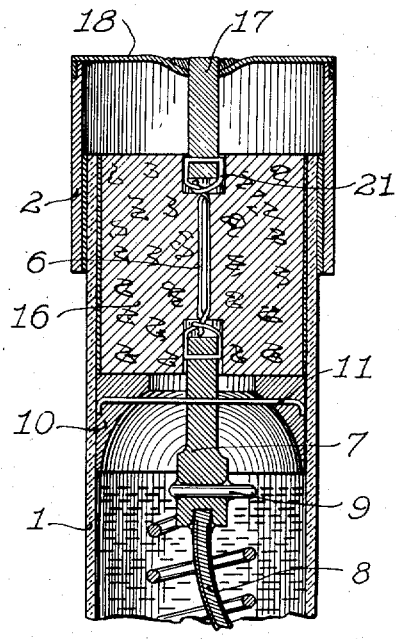
Figure 1 is a longitudinal section of a fuse embodying our invention.

In the form shown in Fig. 1 the fuse wire 6 fits closely in a hole or passage formed in the non-conducting plug 16, which is preferably made of cork. The wire 6 is normally under the tension of the spring 9 and is fastened at its upper end to a plug 17 which is secured to the cover piece or disk 18. The fuse wire 6 being of rather soft metal is not adapted to stand the strain imposed by the tension of the spring 9. We therefore employ a wire 21 of stronger metal to withstand the strain. This wire 21 is connected to the stud 7 and to the plug 17. The fusible wire 6 is thus contained wholly within the cork plug 16 as the stud 7 and the plug 17 abut against said plug. The upper ferrule 2 is normally closed off by the cap 18, as is shown in both forms of fuse. This cap is carefully soldered to the top of the ferrule to prevent the evaporation or escape of the contents of the sleeve 1. The attachment of this cap is such that it will be blown off when the pressure becomes too great.

The sleeve or tube 1 is normally substantially filled with an arc extinguishing liquid which is introduced preferably through an opening in the head of the ferrule 3.

The operation of the fuse is apparent from the above description. In the type shown in Figs. 1 and 2 the non-conducting plug 16 serves to localize the heat generated in the fusible wire 6 and when this wire is melted or fused, the tension wire 21 is subjected to a heavy current. It is fused at once and the spring 9 draws the plunger 10 downward projecting a stream of arc extinguishing liquid 20 upon the space where the arc tends to form. The operation of the form shown in Fig. 3 is substantially identical so far as the extinguishment of the arc is concerned.

We have employed as the material of the sleeve or tube 1 heretofore a piece of glass tubing. We have found that glass is subject to grave defects, chief of which is its lack of strength and uncertainty. This is due largely to the fact that it is brittle and fragile and is easily shattered. In case the arc extinguishing liquid 20 becomes lowered as by leakage or the like, the glass is subject to breakage from the heat of the arc or the sudden pressure of the explosion. It is also sensitive to temperature changes particularly due to its different rate of thermal expansion as compared with metals with which it is employed, and it is therefore hard to make tight joints.

Another difficulty has been the impossibility of machining the same.

To overcome these defects, we have made a number of experiments extending over a considerable time to find a substance which is suited to this purpose. The arc extinguishing liquid which we have employed heretofore is carbon tetrachlorid, and, as this is an excellent solvent of nearly all gums, resins, fats, oils and the like, the problem of providing a suitable container which will not be attacked on the one hand by this carbon tetrachlorid or other liquid or be permeable to the passage of the liquid therethrough, on the other hand, has been attended with great difficulty.

We have discovered, however, that a fiber sleeve impregnated with "bakelite" is suited admirably to this purpose. The sleeve is practically unbreakable; it is not attacked by the arc extinguishing liquid whether it be oil, carbon tetrachlorid or the other polychloro derivatives which we have above set out. This substance can be formed in dies to any desired form; it can be machined and in fact serves admirably for the purpose.

We have found further that is insoluble in carbon tetrachlorid not only to the extent that it does not spoil the insulating properties of the liquid but also to the extent that the strength and insulating qualities of the sleeve are not impaired.

The above described class of compounds, which we have discovered to be especially adapted for use as arc-extinguishing liquids in devices of the character above set forth, are all characterized by the fact that they are good dielectrics, that they are non-inflammable and have valuable fire extinguishing or arc extinguishing properties. These substances also have high boiling points and low vapor pressures as compared to carbon tetrachlorid and therefore do not cause trouble due to evaporation as does carbon tetrachlorid. They are further characterized by very low freezing points as compared to oil and except in case of tetrachloroethylene they have very low freezing points as compared to carbon tetrachlorid. The vapors of these substances do not form explosive mixtures with air as in the case of oil, and they do not stain or deface substances with which they come in contact as does oil. They are, however, very free running fluids so that they are admirably adapted to the quick operation of projecting them upon the space where the arc is formed.

These substances, which may be regarded as chlorin substitution or addition products of the corresponding hydrocarbons, may be prepared commercially according to various methods well known in the chemical art.

We are presenting below a table of properties of these materials to point out to those skilled in the art the particular qualities of each.

| | Boiling point. | Vapor pressure at 20° C. | Specific gravity. |
|---|---|---|---|
| $C_2Cl_4$ tetrachloroethylene (etiline per chloretylene) | 119° C. | 17 MM. | 1.628 |
| $C_2H_2Cl_4$ tetrachloroethane (tetraline) | 144° C. | 11 MM. | 1.6 |
| $C_2HCl_5$ pentachloroethane (pentaline) | 159° C. | 7 MM. | 1.685 |
| $C_2Cl_6$ hexachloroethane | 185° C. | 3 MM. | 2. |

It can be seen that tetrachloroethylene is a perchloro derivative of an unsaturated hydrocarbon, namely, ethylene, $C_2H_4$, while the other substances are poly-chloro derivatives of a saturated hydrocarbon, namely ethane $C_2H_6$.

We do not intend to be limited to employ these substances in a fuse structure only as they are equally applicable for use in the well of a switch employed for the usual switching operation. However, for this purpose the well about the switching element is closed to prevent the escape of the liquid by vaporization. A safety valve is provided for relieving the pressure within the closed well in case of excessive vaporization as would be caused by a particularly heavy arc, and an indicator is provided for indicating the level of the arc extinguishing liquid in the well.

Figure 4:
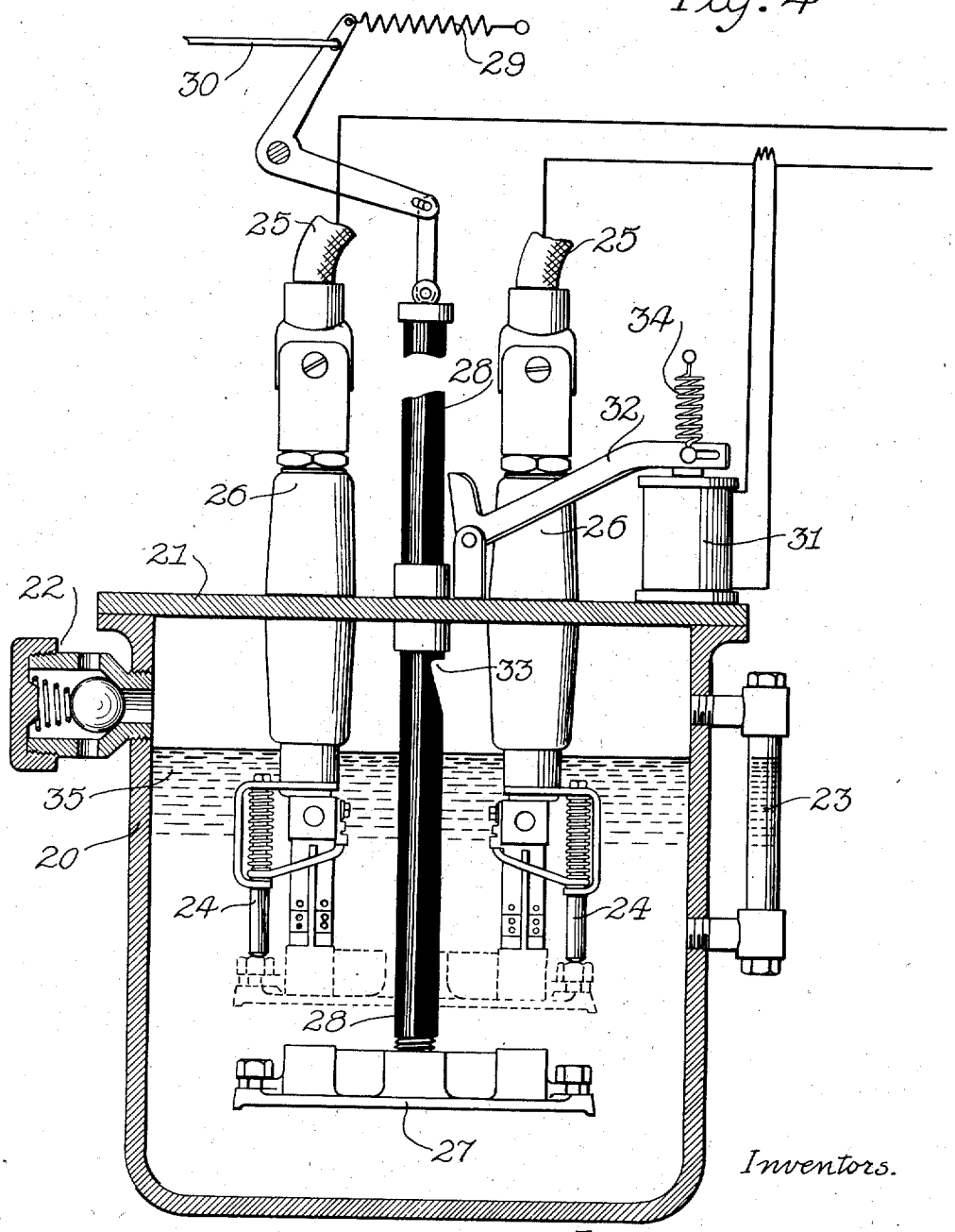
Fig. 4 is a cross section of a switch embodying the invention.

In Fig. 4 we have illustrated a form of switch embodying our invention. This switch comprises a closed vessel 20 provided with the safety valve 22 and liquid level indicator 23. The closed casing 20 includes a cover 21 through which project electrical conductors terminating in the stationary switch contact members 24. These contact members are of the form well known in the art and need not be specifically described here. The conductors 25 which are connected to said contact members are led through the cover 21 by means of suitable insulators 26 which may be of any preferred type. These insulators are sealed into the cover 21 so that a tight joint is maintained A movable switch member 27 adapted for reciprocation into and out of contact with the stationary contact members 24 is mounted on a suitably insulated rod 28 which is guided in the cover 21 and connected by suitable link mechanism through an operating spring 29 and suitable setting means such as the rod 30 for closing the switch. A controlling magnet 31 which is placed in series relation with the line controls a pawl or catch 32 which is adapted to engage in a suitable notch 33 in the rod 28. A spring 34 normally tends to cast the nose of the pawl into the notch.

The closed container 20 holds a body of liquid 35. This liquid may be any one or more of the halogenated hydrocarbons as heretofore set out. We find that they are not as volatile as carbon tetrachorid and will not leak through minute crevices as will carbon tetrachlorid. The operation of the structure above described is obvious. We have found that the improved operation of switching mechanism constructed in accordance with out invention is due, not to the arrangement of the switching mechanism in the particular form shown in Fig. 4, but to the improved operation of the arc extinguishing liquid which forms the subject matter of our invention.

We claim:

1. In combination, a closed container, comprising a sleeve of porous insulating material impregnated with a condensation product of a phenol and formaldehyde, said container having metallic current conducting terminals forming a part of the container, a fusible element connected between said terminals and an arc extinguishing liquid inclosed by said container.

2. In combination, a closed container, comprising a sleeve of fiber impregnated with a condensation product of a phenol and formaldehyde, said container having metallic current conducting terminals forming a part of the inclosure, a fusible element connected between said terminals and an arc extinguishing liquid, said liquid comprising a polychloro derivative of a hydrocarbon.

3. In a device of the class described, a substantially closed container, a pair of circuit terminals in said container adapted to be separated for breaking the flow of current and an arc extinguishing liquid completely covering said terminals for extingushing the arc between said terminals, said liquid comprising a polychloro-derivative of a hydrocarbon having more than one carbon atom in the molecule, and means for relieving the pressure in said container.

4. In combination, a substantially closed container, a body of liquid in the container, said liquid comprising a polychloro-derivative of a hydrocarbon, said container being made of opaque material, and having a pair of metallic terminals exposed on the interior thereof to said liquid, said terminals having means for interrupting a flow of current within said body of liquid.

5. In combination, a substantially closed, substantially fluid-tight container adapted to retain a predetermined pressure, a body of arc extinguishing liquid held in said container, said liquid comprising a polychloro-derivative of a hydrocarbon having more than one carbon atom in the molecule, a pair of metallic terminals submerged at all times in said liquid, said terminals being adapted to draw an arc therebetween under the surface of the liquid to interrupt a flow of current.

6. In a device of the class described, a substantially closed container, a pair of circuit terminals in said container adapted to be separated for breaking the flow of current, and an arc extinguishing liquid disposed within said container in arc extinguishing relation to said terminals, said liquid comprising a polychloro-derivative of a hydrocarbon having more than one carbon atom in the molecule.

7. In a device of the class described, a substantially closed container, a pair of circuit terminals in said container adapted to be separated for breaking the flow of current, and an arc extinguishing substance in fluid condition disposed within said container in arc extinguishing relation to said terminals, said material comprising a polyhalogen derivative of a hydrocarbon having more than one carbon atom in the molecule.

8. In a device of the character described, the combination, with a suitable container, of circuit forming elements in said container separable to open a circuit, and an arc extinguishing liquid disposed in relation to said elements operative to extinguish an arc resulting from separation thereof, said liquid comprising a non-inflammable and relatively non-corrosive halogen derivative of a hydrocarbon, said derivative having a high boiling point, low vapor pressure, and good dielectric properties.

9. In a device of the character described, the combination, with a suitable container, of circuit forming elements in said container separable to open a circuit, and an arc extinguishing liquid disposed in relation to said elements operative to extinguish an arc resulting from separation thereof, said liquid comprising a non-inflammable and relatively non-corrosive chlorin derivative of a hydrocarbon having a boiling point of approximately at least 119° C.

In witness whereof we hereunto affix our signatures.

EDMUND O. SCHWEITZER.
NICHOLAS J. CONRAD,